US012634970B2

(12) United States Patent
Sankar et al.

(10) Patent No.: US 12,634,970 B2
(45) Date of Patent: May 19, 2026

(54) TECHNIQUES FOR CONFIGURING REFERENCE SIGNAL PATTERNS IN WIRELESS COMMUNICATIONS

(71) Applicant: QUALCOMM Incorporated, San Diego, CA (US)

(72) Inventors: Hari Sankar, San Diego, CA (US); June Namgoong, San Diego, CA (US); Jing Jiang, San Diego, CA (US); Jae Won Yoo, San Diego, CA (US); Alexandros Manolakos, San Diego, CA (US); Joseph Binamira Soriaga, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/798,070

(22) Filed: Oct. 30, 2017

(65) Prior Publication Data

US 2018/0132223 A1 May 10, 2018

Related U.S. Application Data

(60) Provisional application No. 62/417,944, filed on Nov. 4, 2016, provisional application No. 62/419,244, filed on Nov. 8, 2016.

(51) Int. Cl.
*H04W 72/04* (2023.01)
*H04L 5/00* (2006.01)
(Continued)

(52) U.S. Cl.
CPC ........... *H04W 72/51* (2023.01); *H04L 5/0048* (2013.01); *H04L 5/0051* (2013.01);
(Continued)

(58) Field of Classification Search
CPC ............... H04W 72/048; H04W 88/02; H04W 72/0446; H04L 5/0048
See application file for complete search history.

(56) References Cited

U.S. PATENT DOCUMENTS 9,706,599 B1 * 7/2017 Zhang .................. H04J 11/0026
2006/0025079 A1 * 2/2006 Sutskover ............. H04L 5/0051
455/67.11
(Continued)

FOREIGN PATENT DOCUMENTS

CN 101753193 * 6/2010 ............... H04B 7/04
CN 102137049 A 7/2011
(Continued)

OTHER PUBLICATIONS

Ericsson: "Frame Structure and DMRS Positions", 3GPP Draft; R1-167079, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016 Aug. 21, 2016 (Aug. 21, 2016 ), XP051125687, Retrieved from the Internet: URL:http://www.3gpp.org/ftp/Meetings_3GPP_SYNC/RAN1/Docs/ [retrieved on Aug. 21, 2016], 6 pages.

(Continued)

*Primary Examiner* — Muthuswamy G Manoharan
(74) *Attorney, Agent, or Firm* — QUALCOMM Incorporated

(57) ABSTRACT

An apparatus and method of wireless communications includes transmitting, by a user equipment (UE), a mid-amble position indication and/or a UE capability information, wherein at least one of the mid-amble position indication or the UE capability information facilitate identification of a mid-amble position within a slot. Additionally, the aspects include receiving, by the UE, a transmission including a transmitted slot having a preamble and a mid-amble,
(Continued)

800 wherein the mid-amble is at the mid-amble position within the slot as determined based at least in part on the at least one of the mid-amble position indication or the UE capability information. For example, the preamble and the mid-amble include pilot signals, such as Demodulation Reference Signals (DMRSs).

14 Claims, 8 Drawing Sheets

(51) Int. Cl.

| | |
|---|---|
| *H04W 72/0446* | (2023.01) |
| *H04W 72/51* | (2023.01) |
| *H04W 8/22* | (2009.01) |
| *H04W 88/02* | (2009.01) |

(52) U.S. Cl.
CPC .......... *H04L 5/0053* (2013.01); *H04L 5/0092* (2013.01); *H04W 72/0446* (2013.01); *H04L 5/0007* (2013.01); *H04W 8/22* (2013.01); *H04W 88/02* (2013.01)

(56) References Cited

U.S. PATENT DOCUMENTS

| | | | | |
|---|---|---|---|---|
| 2011/0026627 A1* | 2/2011 | Chun | .................... | H04L 5/0007 |
| | | | | 375/260 |
| 2011/0090979 A1* | 4/2011 | Ponnampalam | ..... | H04B 7/0684 |
| | | | | 375/260 |
| 2011/0200018 A1* | 8/2011 | Tazeh Mahalleh | ..... | H04L 5/001 |
| | | | | 370/336 |
| 2012/0134338 A1* | 5/2012 | Ko | ........................ | H04L 5/0048 |
| | | | | 370/330 |
| 2013/0039332 A1 | 2/2013 | Nazar et al. | | |
| 2014/0092811 A1* | 4/2014 | Kim | ...................... | H04W 24/02 |
| | | | | 370/328 |
| 2014/0301238 A1 | 10/2014 | Chun et al. | | |
| 2015/0124638 A1* | 5/2015 | Sun | ....................... | H04L 5/0053 |
| | | | | 370/252 |
| 2015/0304080 A1* | 10/2015 | Yi | ............................ | H04L 1/08 |
| | | | | 370/329 |
| 2016/0057753 A1* | 2/2016 | Yang | ..................... | H04L 5/0051 |
| | | | | 370/336 |
| 2016/0205540 A1 | 7/2016 | Wu | | |
| 2016/0353424 A1* | 12/2016 | Stirling-Gallacher | ....................... | |
| | | | | H04B 7/0626 |
| 2017/0142699 A1 | 5/2017 | Kang et al. | | |
| 2017/0208588 A1 | 7/2017 | Park et al. | | |
| 2017/0288837 A1 | 10/2017 | Namgoong et al. | | |
| 2017/0317731 A1* | 11/2017 | Chen | ........................ | H04B 7/04 |
| 2018/0063820 A1 | 3/2018 | Xiong et al. | | |
| 2018/0069652 A1* | 3/2018 | Yamamoto | ............ | H04L 5/0051 |

FOREIGN PATENT DOCUMENTS

| | | | |
|---|---|---|---|
| CN | 103166880 A | 6/2013 |
| CN | 104301073 A | 1/2015 |
| CN | 104604314 A | 5/2015 |
| CN | 101867948 B | 6/2015 |
| CN | 105075359 A | 11/2015 |
| CN | 105812105 A | 7/2016 |
| JP | 2009171025 A | 7/2009 |
| WO | 2013086946 A1 | 6/2013 |
| WO | 2014054867 A1 | 4/2014 |

OTHER PUBLICATIONS

International Search Report and Written Opinion—PCT/US2017/059267—ISA/EPO—Feb. 23, 2018.

LG Electronics: "DMRS Design Issues in NR", 3GPP Draft; R1-1609259 Lg_Issues on NR DMRS Design, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016 Oct. 9, 2016 (Oct. 9, 2016), XP051149305, Retrieved from the Internet: URL:http://www.3gpp.org/ftp/Meetings_3GPP_SYNC/RAN1/Docs/ [retrieved on Oct. 9, 2016], 8 pages.

Qualcomm Incorporated: "Views on DL DMRS", 3GPP Draft; R1-1610152_Views on DL DMRS, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016 Oct. 9, 2016 (Oct. 9, 2016), XP051150175, Retrieved from the Internet: URL:http://www.3gpp.org/ftp/Meetings_3GPP_SYNC/RAN1/Docs/ [retrieved on Oct. 9, 2016], 5 pages.

* cited by examiner

DMRS

DL Control

Guard time

UL Channels (e.g., ACK)

PDSCH and other channels

DMRS

DL Control

Guard time

UL Channels (e.g., ACK)

PDSCH and other channels

DMRS

DL Control

Guard time

UL Channels (e.g., ACK)

PDSCH and other channels

700

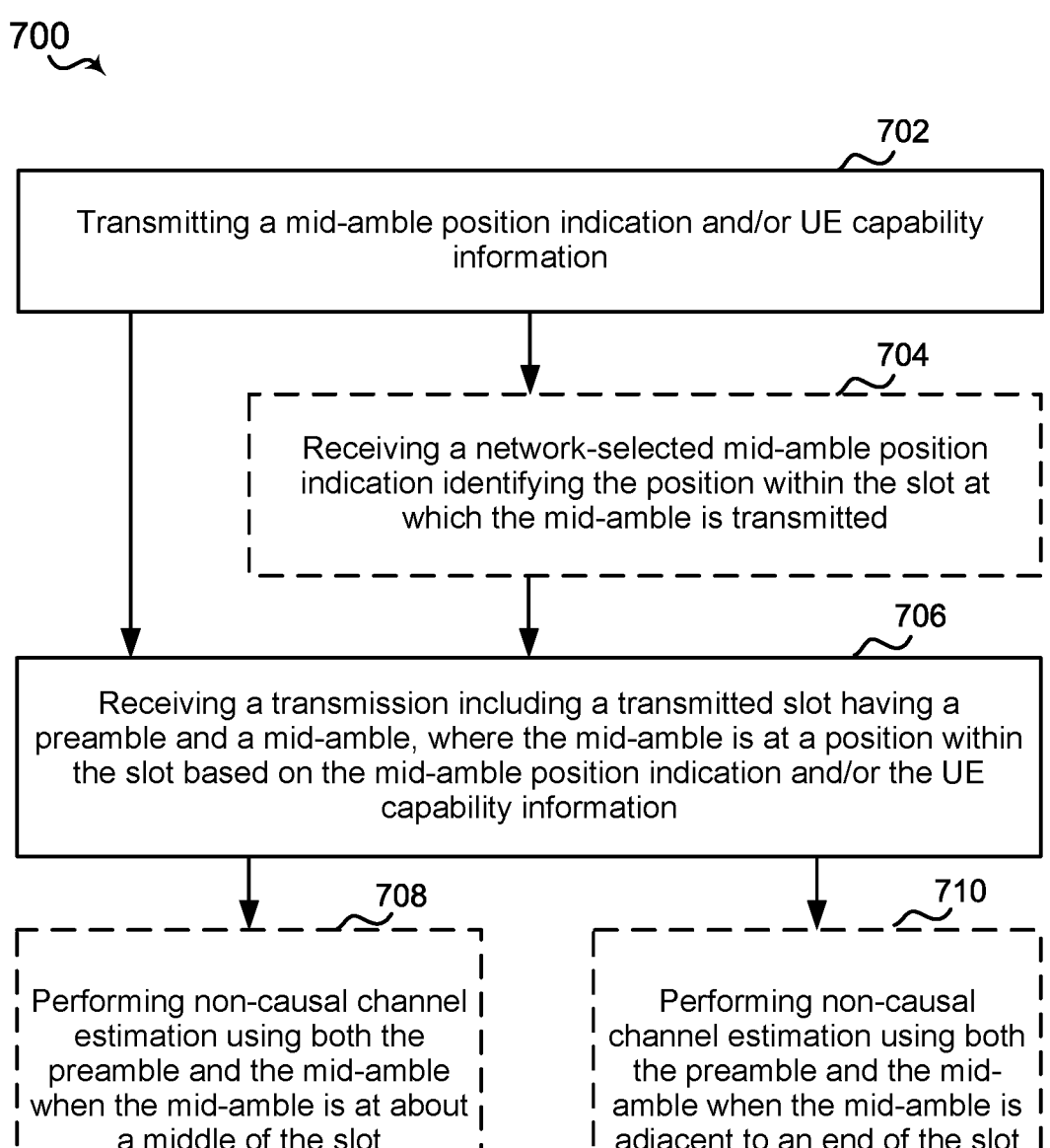

702

Transmitting a mid-amble position indication and/or UE capability information

704

Receiving a network-selected mid-amble position indication identifying the position within the slot at which the mid-amble is transmitted

706

Receiving a transmission including a transmitted slot having a preamble and a mid-amble, where the mid-amble is at a position within the slot based on the mid-amble position indication and/or the UE capability information

708

Performing non-causal channel estimation using both the preamble and the mid-amble when the mid-amble is at about a middle of the slot

710

Performing non-causal channel estimation using both the preamble and the mid-amble when the mid-amble is adjacent to an end of the slot

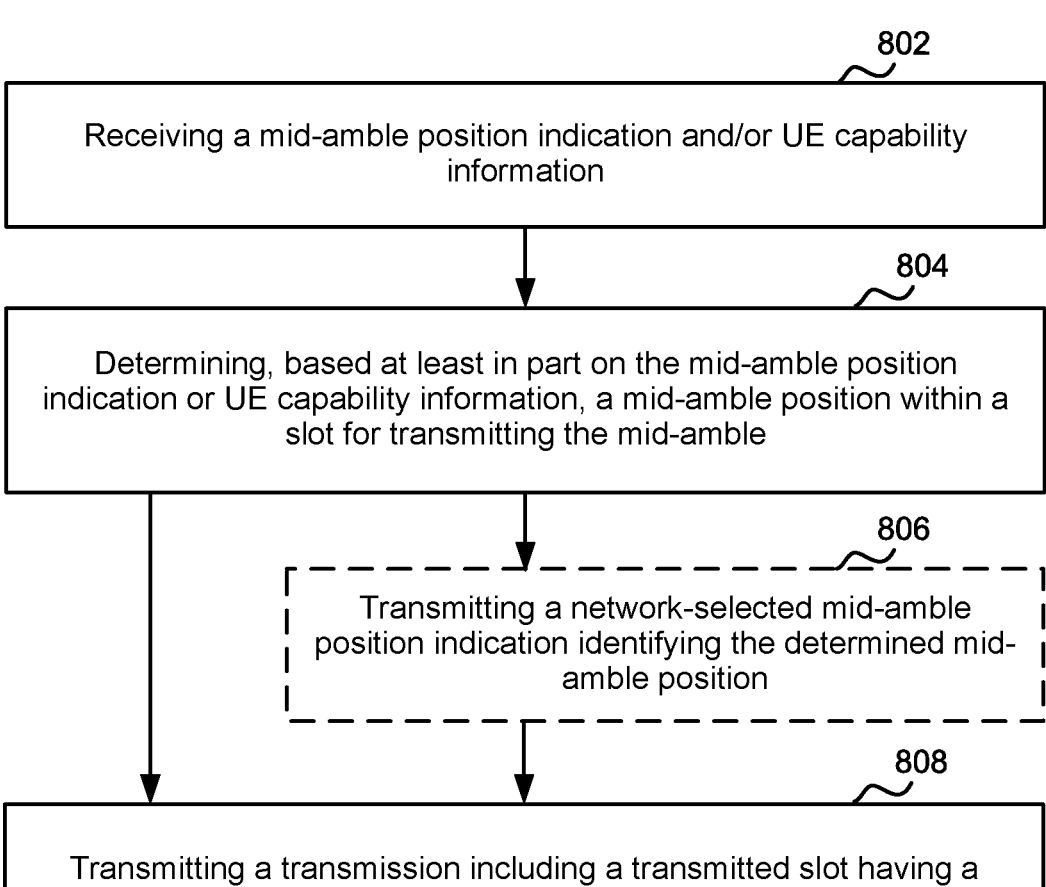

802

Receiving a mid-amble position indication and/or UE capability information

804

Determining, based at least in part on the mid-amble position indication or UE capability information, a mid-amble position within a slot for transmitting the mid-amble

806

Transmitting a network-selected mid-amble position indication identifying the determined mid-amble position

808

Transmitting a transmission including a transmitted slot having a preamble and a mid-amble, where the mid-amble is at the determined mid-amble position

FIG. 8

TECHNIQUES FOR CONFIGURING REFERENCE SIGNAL PATTERNS IN WIRELESS COMMUNICATIONS

CLAIM OF PRIORITY UNDER 35 U.S.C. § 119

The present Application for Patent claims the benefit of and priority to Provisional Application No. 62/417,944, entitled "UE CAPABILITY DEPENDENT DMRS PATTERN" filed Nov. 4, 2016, and Provisional Application No. 62/419,244, entitled "UE CAPABILITY DEPENDENT DMRS PATTERN" filed Nov. 8, 2016, which are assigned to the assignee hereof and hereby expressly incorporated by reference herein for all purposes.

BACKGROUND

Aspects of the present disclosure relate generally to wireless communication networks, and more particularly, to reference signal patterns in wireless communications.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current transmission of pilot signals may not allow efficient channel estimation at the user equipment, such as in moderate Doppler spread scenarios, causing degradation in data throughput. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications including transmitting, by a user equipment (UE), a mid-amble position indication, or a UE capability information, or both, where at least one of the mid-amble position indication or the UE capability information facilitate identification of a mid-amble position within a slot. Additionally, the method includes receiving, by the UE, a transmission including a transmitted slot having a preamble and a mid-amble, wherein the mid-amble is at the mid-amble position within the slot as determined based at least in part on at least one of the mid-amble position indication or the UE capability information. For example, the preamble and the mid-amble include pilot signals, such as Demodulation Reference Signals (DMRSs).

In another aspect, an apparatus is described that includes a transceiver for communicating one or more wireless signals via one or more antennas, a memory configured to store instructions, and one or more processors communicatively coupled with the transceiver and the memory. The one or more processors are configured to transmit a mid-amble position indication, or a UE capability information, or both, where at least one of the mid-amble position indication or the UE capability information facilitate identification of a mid-amble position within a slot, and receive a transmission including a transmitted slot having a preamble and a mid-amble, wherein the mid-amble is at the mid-amble position within the slot as determined based at least in part on at least one of the mid-amble position indication or the UE capability information.

In another aspect, a method of wireless communications is described that includes receiving, by a base station and from a UE, a mid-amble position indication, or a UE capability information, or both, determining, based at least in part on at least one of the mid-amble position indication or UE capability information, a mid-amble position within a slot for transmitting a mid-amble, and transmitting, by the base station, a transmission including a transmitted slot having a preamble and the mid-amble, wherein the mid-amble is at the mid-amble position as determined based at least in part on at least one of the mid-amble position indication or the UE capability information.

In addition, in an aspect, an apparatus is described that includes a transceiver for communicating one or more wireless signals via one or more antennas, a memory configured to store instructions, and one or more processors communicatively coupled with the transceiver and the memory. The one or more processors are configured to receive, from a UE, a mid-amble position indication, or a UE capability information, or both, determine, based at least in part on at least one of the mid-amble position indication or UE capability information, a mid-amble position within a slot for transmitting a mid-amble, and transmit a transmission including a transmitted slot having a preamble and the mid-amble, wherein the mid-amble is at the mid-amble position as determined based at least in part on at least one of the mid-amble position indication or the UE capability information.

Moreover, the present disclosure also includes apparatus having components or configured to execute or means for executing the above-described methods, and/or computer-readable medium storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 7 is a flow diagram of an example of a method of receiving a mid-amble in accordance with aspects described herein; and FIG. 8 is a flow diagram of an example method of transmitting a mid-amble in accordance with aspects described herein.

DETAILED DESCRIPTION

Figure 1:
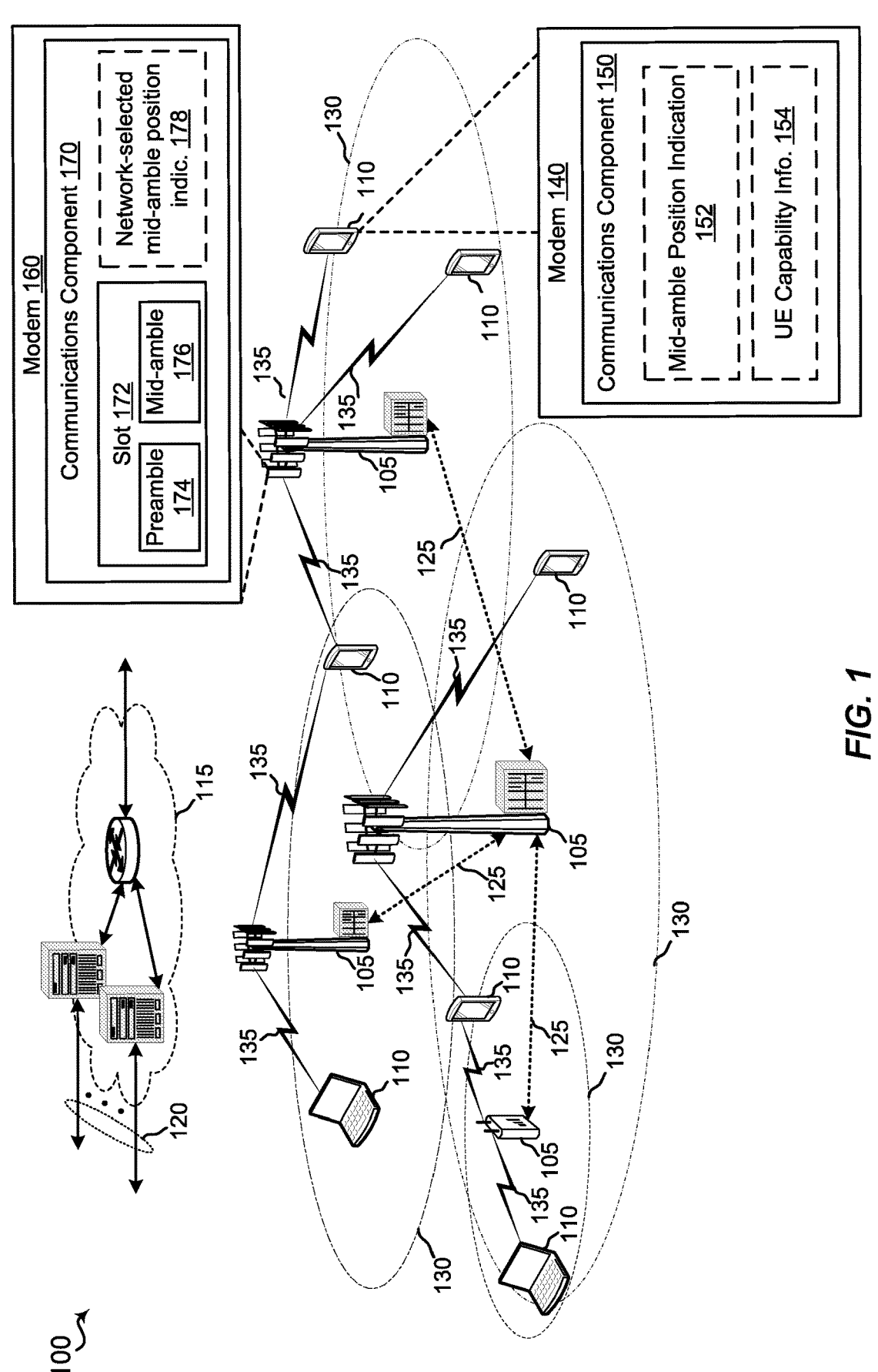
FIG. 1 is a schematic diagram of an example wireless communication network including at least one user equipment (UE) and at least one base station each having a respective communications component configured to enable mid-amble signaling in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to configuring reference signal transmission in wireless communications. For example, reference signals can be transmitted in one or more positions within a time division, such as one or more symbols (e.g., orthogonal frequency division multiplexing (OFDM), single carrier frequency division multiplexing (SC-FDM), etc. symbols in a slot, subframe, and/or the like). For example, a slot can include a plurality of contiguous (e.g., in time) symbols, which can each be associated with a similar frequency band (e.g., including one or more subcarriers) in wireless communications. In this regard, for example, reference signals can be transmitted in one or more symbols within a slot, such as in a preamble portion of the slot, which can be defined to include one or more symbols at the beginning of the slot, a mid-amble of the slot, which can be defined to include one or more symbols in the middle of the slot, etc. Transmitting the reference signals in multiple symbol positions within a slot can improve receiving of the reference signals and/or can improve channel estimation, decoding of data, etc. based on the reference signals, as environmental conditions may change between transmissions of the reference signal even within the slot duration.

Transmitting multiple reference signals in a slot can result in receiver complexity to obtain and process the reference signals for use in estimating a channel, decoding data, etc. Indeed, some receivers (e.g., user equipment (UE)) may not be able to receive and process multiple reference signals, and/or may require a certain amount of time to receive and process reference signals before the reference signals can be used. In this regard, the existence of, and/or optimal position of, a mid-amble reference signals may be dependent on receiver capabilities. In this regard, the receiver can indicate one or more parameters to the transmitter of the reference signal, which the transmitter can use in determining whether and/or where to transmit the mid-amble reference signal.

In a specific example, a UE can transmit a mid-amble position indication or UE capability information to a base station, wherein the mid-amble position indication and the UE capability information can identify, or can be used to identify, a mid-amble position for a reference signal (e.g., demodulation reference signal (DMRS) or other pilot signal) within a slot. Further, a UE can receive a transmission, e.g., from the base station, including a transmitted slot having a preamble reference signal and a mid-amble reference signal, where the mid-amble reference signal is at a position (e.g., symbol) within the slot based on the mid-amble position indication or the UE capability information. A preamble reference signal may be referred to herein as the "preamble," and the mid-amble reference signal may be referred to herein as the "mid-amble."

Additional features of the present aspects are described in more detail below with respect to FIGS. 1-8.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example of a wireless communication network 100 includes at least one base station 105 and at least one UE 110. UE 110 includes a modem 140 having a communications component 150 that optionally transmits a mid-amble position indication 152 or UE capability information 154, where the mid-amble position indication and/or the UE capability information can identify, or facilitate identification of, a position within a slot during which the UE 110 is capable of receiving and processing a mid-amble reference signal. Base station 105 includes a modem 160 having a communications component 170 that receives the information from UE 110 and transmits a slot 172 having a preamble 174 and/or a mid-amble 176, wherein mid-amble 176 is positioned within slot 172 based on, at least, mid-amble position indication 152 or UE capability information 154. As such, UE 110 receives the transmission including slot 172 having preamble 174 and mid-amble 176. In some aspect, such as when base station 105 does not transmit mid-amble 176 within slot 172 at a position desired by UE 110, base station 105 may transmit a network-selected mid-amble position indication 178 to inform UE 110 of the position within slot 172 that base station 105 transmits mid-amble 176. In an aspect, for example, preamble 174 and mid-amble 176 may include pilot signals, such as reference signals (e.g., DMRS). Thus, according to the present disclosure, UE 110 can perform channel estimation procedures based on the reference signals received at the position of mid-amble 176 within slot 172, which can be located within slot 172 based on mid-amble position indication 152 or UE capability information 154 signaled by UE 110.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 110 with service subscriptions with the network provider.

A small cell may include a relatively lower transmitpowered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packetbased networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
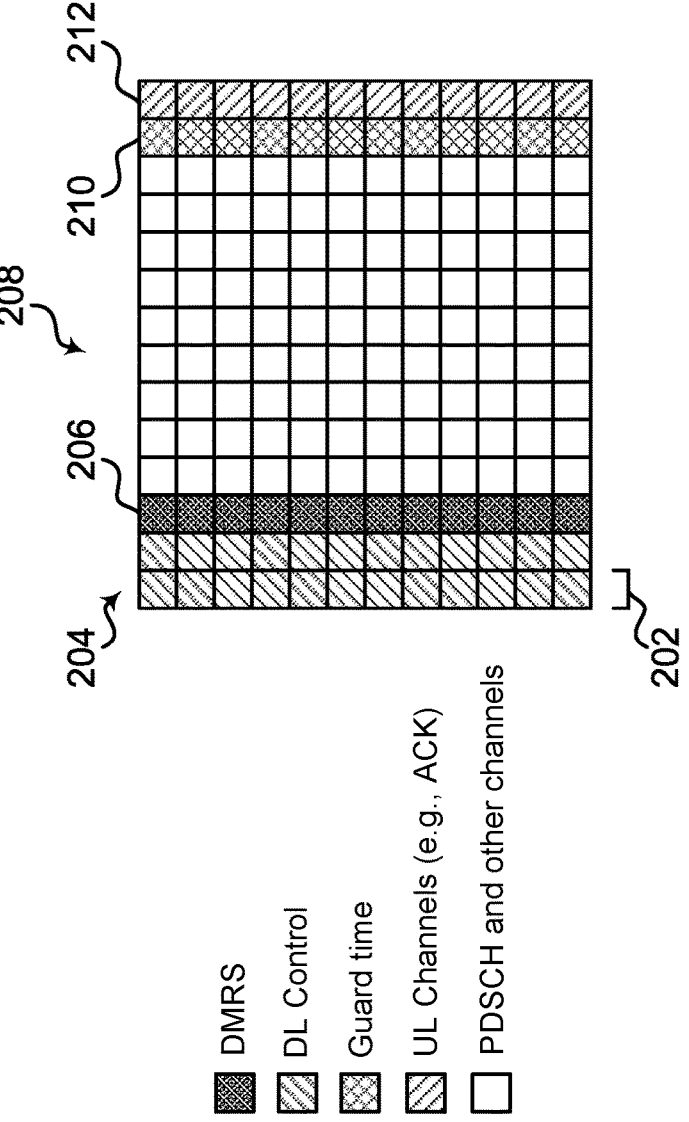
FIG. 2 is a block diagram of an example slot structure with a single demodulation reference signal (DMRS) in accordance with aspects described herein.

Referring to FIG. 2, an example of a slot 200 formatted for wireless communications (e.g., in 5G NR, LTE, etc.) is illustrated. The slot 200 may include a plurality of symbols 202 (e.g., OFDM symbols, SC-FDM symbols, etc.) defined as a portion of frequency (e.g., a collection of subcarriers) over time. As shown in FIG. 2, frequency is represented by the vertical axis and time is represented by the horizontal axis. For example, the slot 200 can include symbols 202 (e.g., 14 symbols as depicted), which can be of similar duration. Slot 200 can be formatted for transmitting various signals and/or channels using the symbols 202. For instance, the signals or channels may include, but are not limited to, one or any combination of: downlink (DL) control signals in symbols 204, which may include a control data channel such as a physical downlink control channel (PDCCH); a pre-amble DMRS, e.g., a pilot signal or other reference signal transmitted by base station 105 for use by UE 110 to perform the estimation of one or more channels, in symbol 206; one or more downlink data signals in symbols 208, which may include a shared data channel such as a physical downlink shared channel (PDSCH) and may be channel estimated based on the DMRS; guard time or guard resources in symbol 210; uplink (UL) channels, which can include uplink control data (e.g., physical uplink control channel (PUCCH)), uplink data (e.g., physical uplink shared channel (PUSCH)), etc. in symbol 212, and/or the like. The uplink control data can include HARQ feedback, such as an acknowledgement (ACK) or non-acknowledgement (NACK) indication for downlink data transmitted over the PDSCH and/or PDCCH.

In order for the UE to send ACK/NACK for the data received in the same slot, DMRS is typically placed toward the beginning of the slot, as shown for the preamble DMRS in symbol 206 of slot 200. As described herein, such a front-loaded DMRS can be referred to as a "preamble" in this disclosure. This pilot placement within the slot allows the data decoding to start as soon as the data symbols (i.e. PDSCH) are received. Furthermore, this enables the UE receiver to achieve pipeline processing of channel estimation, data demodulation/decoding, and send ACK in the first UL opportunity after the reception of the data (e.g., in symbol 212 in FIG. 2).

The wireless communication environment can change over time, and indeed within the slot, however, and the channel estimation quality achievable across the slot 200 given a single DMRS, even in moderate Doppler spread scenarios (e.g. 20 Hz), may cause significant degradation in the data throughput, especially at high signal-to-noise ratio (SNR).

Figure 3:
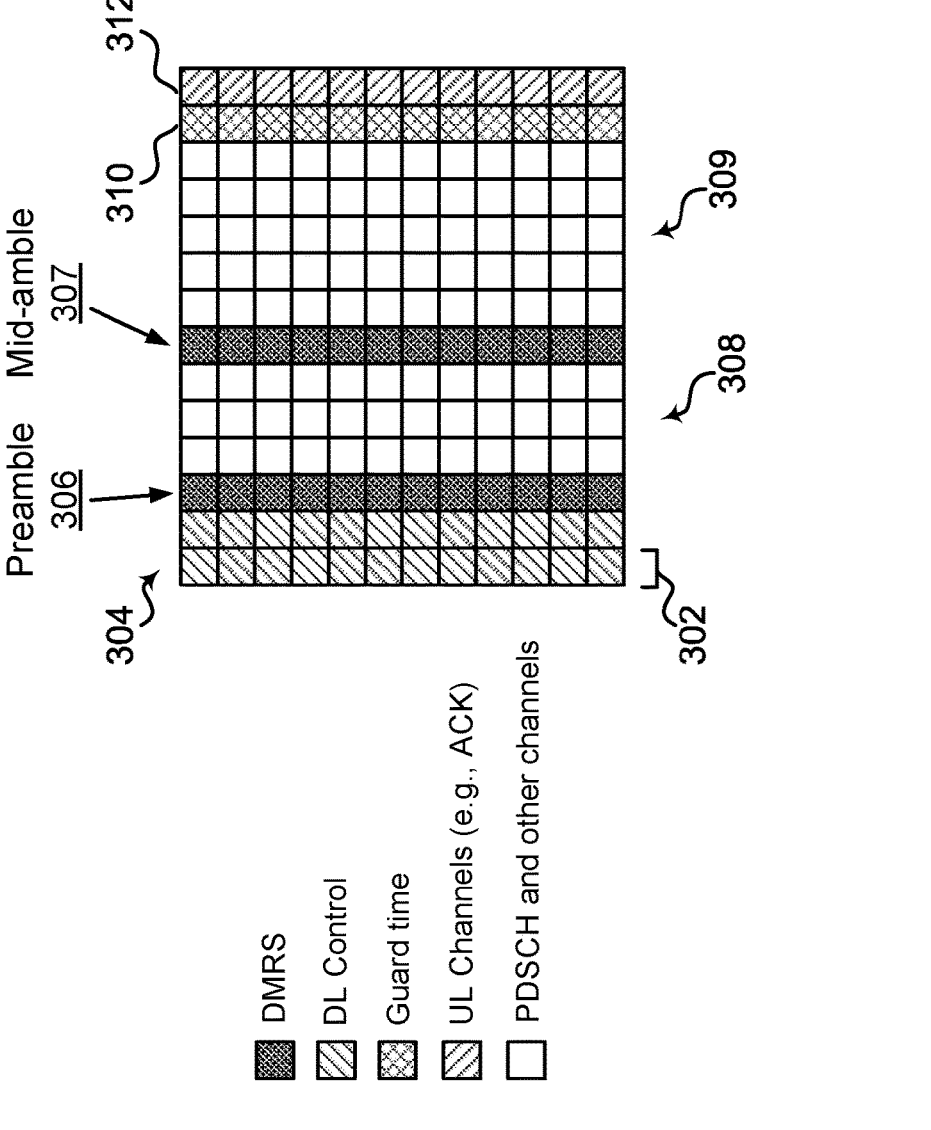
FIG. 3 is a block diagram of an example slot structure with a preamble and mid-amble DMRS in accordance with aspects described herein.

Referring to FIG. 3, an example of a slot 300, formatted for wireless communications (e.g., in 5G NR, LTE, etc.) and including additional pilot signaling to improve the data performance, is illustrated. For instance, data performance may be improved by placing additional DMRS (referred to in this disclosure as a "mid-amble") later in the slot. In this regard, slot 300 includes a plurality of symbols 302, similar to symbols 202 in FIG. 2, and including control data symbol 304, a preamble DMRS symbol 306, and a region of data symbols 308, which is smaller than the region of data symbols 208 in FIG. 2, and channel estimation for these data symbols 308 can be performed based on the preamble DMRS 306. Slot 300 also includes a mid-amble DMRS symbol 307 over which another DMRS is transmitted to be used in performing channel estimation for a later region of data symbols 309. Slot 300 also includes guard time or guard resources in symbol 310 and UL in symbol 312. As shown in FIG. 3, frequency is represented by the vertical axis and time is represented by the horizontal axis.

For example, channel estimation of data received after the mid-amble DMRS can be performed using the mid-amble DMRS, which can provide a more accurate representation of the wireless communication environment for the later data symbols than the preamble DMRS. This can be referred to as extrapolation based channel estimation. As long as the extrapolation based channel estimation (i.e. causal channel estimation, or channel prediction) is employed, however, the increase in the supportable Doppler may be limited. To achieve meaningful expansion of supported Doppler range, the interpolation based channel estimation (i.e. non-causal channel estimation) can be employed as much as possible. Thus, the interpolation based channel estimation (e.g., based on the preamble DMRS) can be applied for the channel estimates on symbols in between the preamble and the mid-amble, and the extrapolation based channel estimation (e.g., based on the mid-amble DMRS) can be applied for the channel estimates on symbols after the mid-amble. This may be achieved, possibly, at the cost of increase in the receiver complexity, since the data decoding may not start until the mid-amble DMRS is received. It may be desirable, however, to place the mid-amble as close to the end of the slot as possible. Therefore, given a potential receiver complexity concern, an optimum or otherwise beneficial mid-amble position may depend on, and thus be different based on, UE capabilities for receiving and processing the DMRS.

Figure 4:
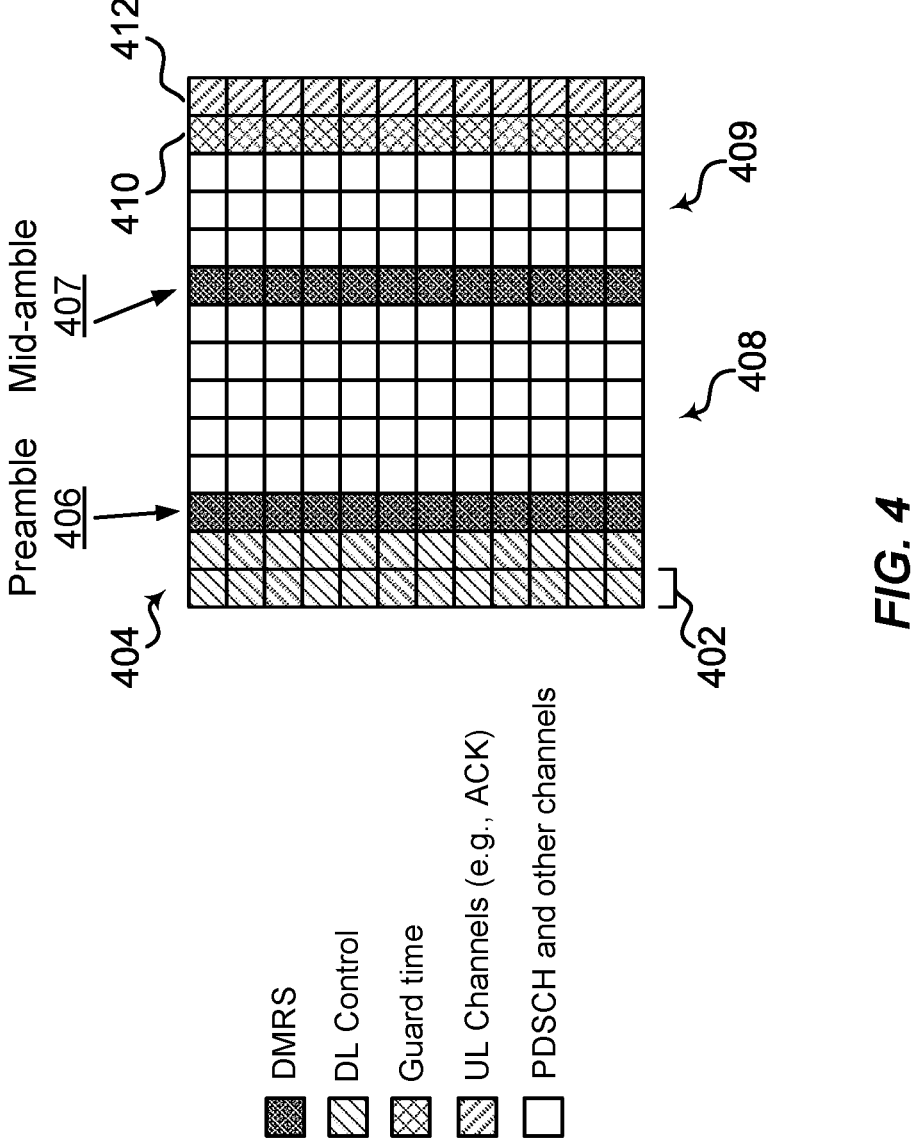
FIG. 4 is a block diagram of an example slot structure with a preamble and later mid-amble DMRS in accordance with aspects described herein.

For example, some UEs can perform non-causal channel estimation using both the preamble and the mid-amble, when the mid-amble is placed at the middle of the slot. On the other hand, more advanced UEs having increased receiver performance can perform non-causal channel estimation using both the preamble and the mid-amble, when the mid-amble is placed near the end of the slot, as shown in FIG. 4. Referring to FIG. 4, an example of a slot 400 is shown with a mid-amble DMRS symbol 407 near or adjacent to or closer to (as compared to slot 300) an end of the slot. In this example, slot 400 is otherwise similar to slot 300 in FIG. 3, including various symbols 402 such as a DL control symbols 404, a preamble DMRS symbol 406, regions of data symbols 408, 409, guard time or guard resources in symbol 410, UL in symbol 412, etc. UEs having more advanced receiver capabilities may properly receive and process symbols in slot 400, where the mid-amble DMRS symbol 407 is closer to the end of the slot 400 than mid-amble DMRS symbol 307 is to slot 300. As shown in FIG. 4, frequency is represented by the vertical axis and time is represented by the horizontal axis.

Thus, according to the present aspects, the presence of the mid-amble and/or the mid-amble position (e.g., symbol) within the slot can be configurable. In one example, UE 110 can be configured to indicate mid-amble position indication 152 to base station 105. In another example, UE 110 indicates UE capability information 154 to base station 105, where UE capability information 154 can be used to derive (e.g., mapped to) the mid-amble position.

In response to the receiving mid-amble position indication 152 or UE capability information 154, base station 105 can determine the mid-amble position (e.g., symbol) within the slot 172 for the UE 110, in the formation of the slot 172. In other words, when base station 105 transmits slot 172 to this UE 110, it can transmit preamble 174 and mid-amble 176, where mid-amble 176 is placed at the position determined for the UE 110, whether based on the received mid-amble position indication 152, derived from UE capability information 154, etc. For example, base station 105 can determine the mid-amble position for each slot generated for the UE 110, certain types of slots generated for the UE 110, which may be contiguous in time or not contiguous in time, etc. Moreover, for example, base station 105 can determine different mid-amble positions for different UEs 110, with which the base station 105 may concurrently communicate, and can generate communications in corresponding concurrently slots for each of the UEs 110.

In some cases, UE 110 can indicate a latest (e.g., relative to an end of slot 172) mid-amble position to base station 105. Such an indication may be transmitted using static or semi-static or dynamic signaling. For instance, this signaling could be part of the uplink control information (UCI) in PUCCH. In this case, the signaling could be every slot/ subframe or only during the UL-centric slots/subframes. Thus, for example, UE 110 may determine the indication itself (e.g., based on sensing wireless environment parameters), and may signal the indication to the base station 105.

In another example, UE capability information 154 may indicate the latest mid-amble position that UE 110 can handle (e.g., based on processing capabilities). In this case, then such signaling may be static as opposed to dynamic signaling. For example, the UE 110 may communicate the static indication to the base station 105 when establishing a connection to the base station 105, using radio resource control (RRC) signaling, etc.

In response, base station 105 may, for example, determine a mid-amble position based, at least in part, on considering multiple served UEs' indicated mid-amble position or capability information. For instance, base station 105 can still determine to position the mid-amble 176 at a certain symbol in the slot (but earlier than the latest position that UE 110 can handle) or even may not add a mid-amble in the slot at all. In an aspect, base station 105 can signal to the UEs 110 the position of the mid-amble 176, e.g., such as with network-selected mid-amble position indication 178, which may be transmitted in the downlink control information (DCI).

In an aspect, the default assumption could be that base station 105 follows the indication of UE 110 unless base station 105 signals something different on the DCI.

Figure 5:
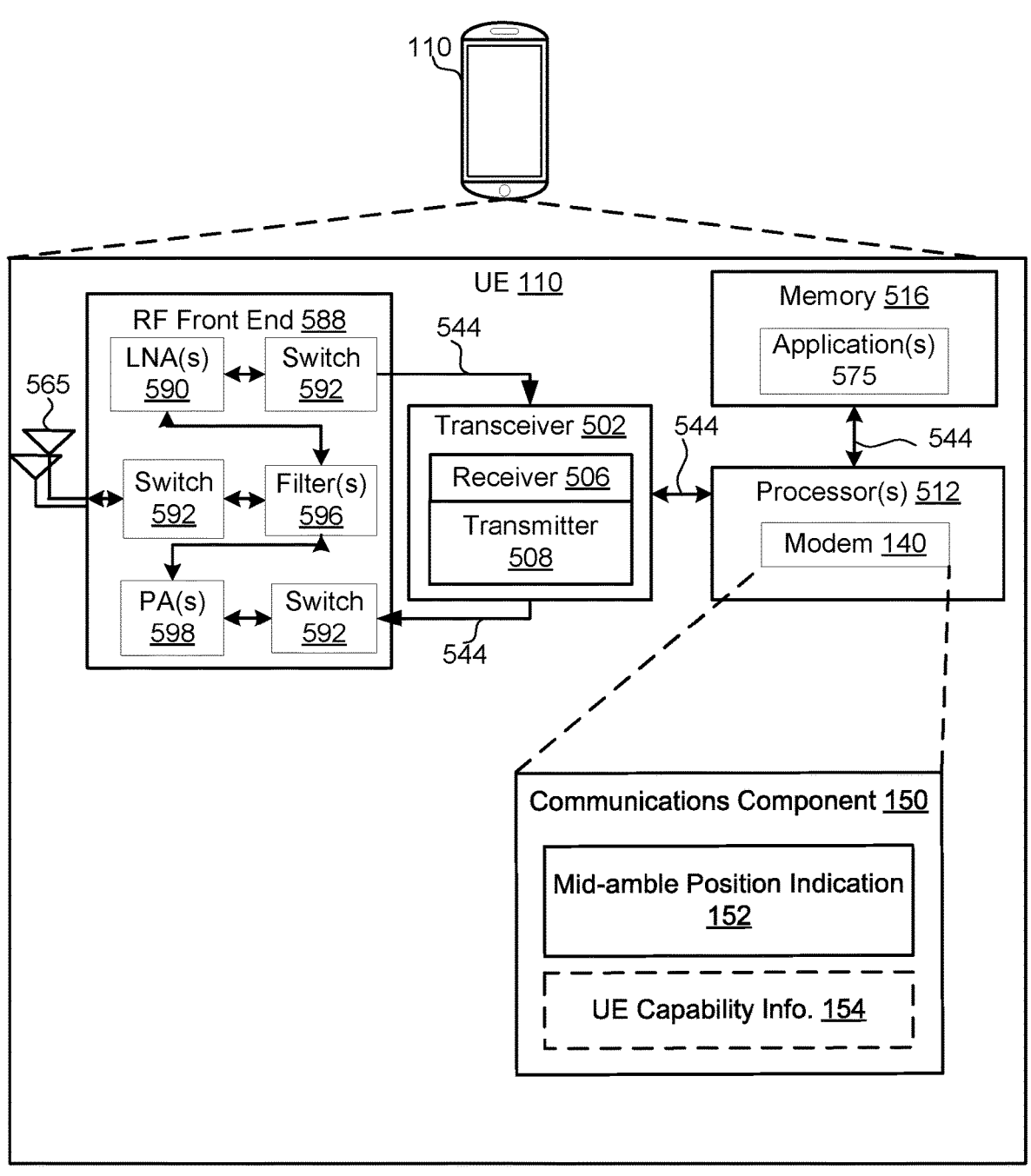
FIG. 5 is a schematic diagram of some components of an example UE in accordance with aspects described herein.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140 and communications component 150 to enable one or more of the functions described herein. Further, the one or more processors 512, modem 140, memory 516, transceiver 502, RF front end 588 and one or more antennas 586, may be configured to support voice and/or data calls (simultaneously or non-simultaneously) in one or more radio access technologies.

In an aspect, the one or more processors 512 can include a modem 140 that uses one or more modem processors. The various functions related to communications component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with communications component 150 may be performed by transceiver 502.

Also, memory 516 may be configured to store data used herein and/or local versions of applications 575 or communications component 150 and/or one or more of its subcomponents being executed by at least one processor 512.

Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining communications component 150 and/or one or more of its subcomponents, and/or data associated therewith, when UE 110 is operating at least one processor 512 to execute communications component 150 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 105 or wireless transmissions transmitted by UE 110. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas

565 via RF front end 588. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 502 to operate at a specified frequency and power level based on the UE configuration of the UE 110 and the communication protocol used by modem 140.

In an aspect, modem 140 can be a multiband-multimode modem, which can process digital data and communicate with transceiver 502 such that the digital data is sent and received using transceiver 502. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 6:
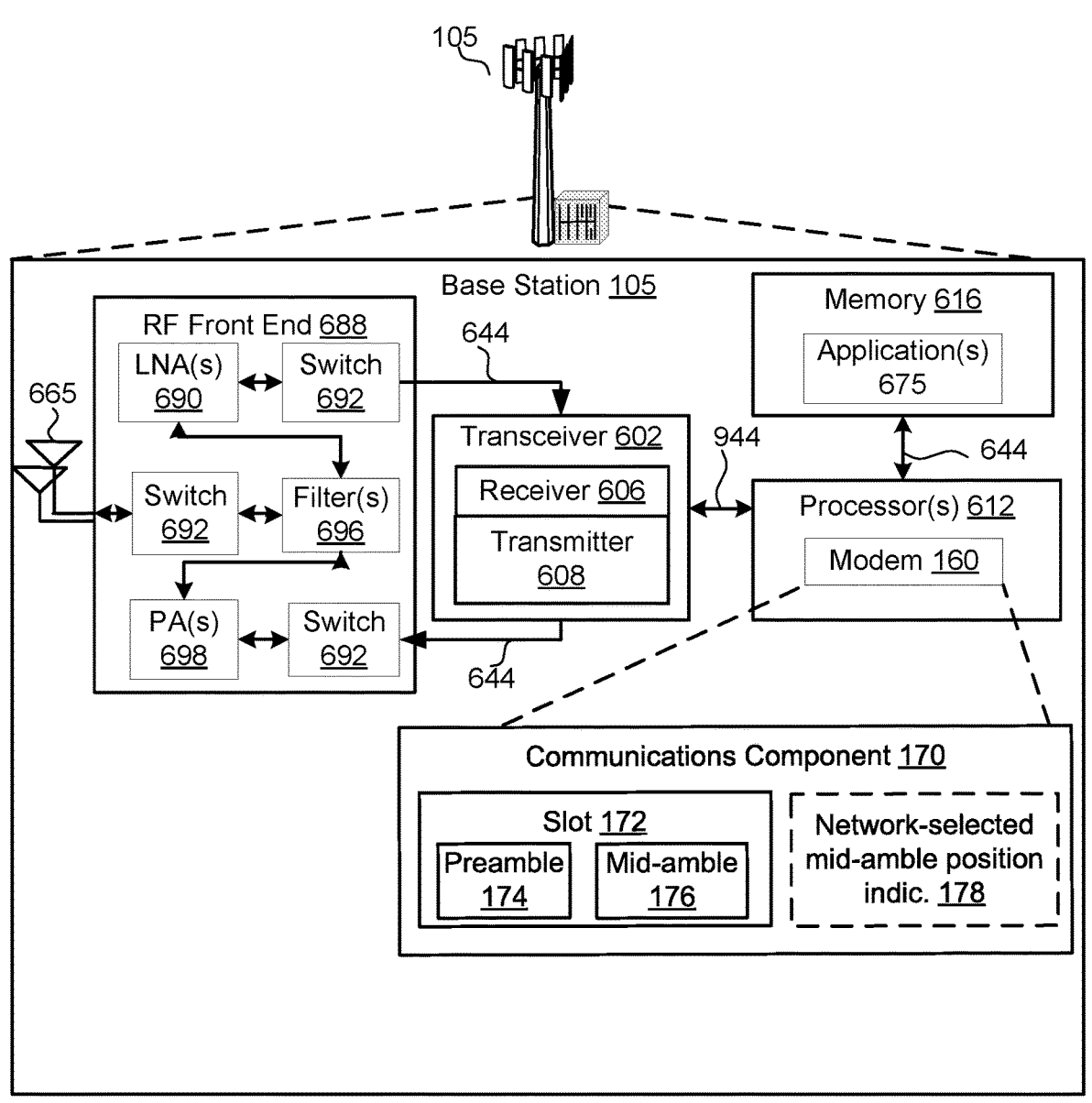
FIG. 6 is a schematic diagram of some components of an example base station in accordance with aspects described herein.

Referring to FIG. 6, one example of an implementation of base station 105 may include a variety of components, some of which have already been described above, but including components such as one or more processors 612 and memory 616 and transceiver 602 in communication via one or more buses 644, which may operate in conjunction with modem 160 and communications component 170 to enable one or more of the functions described herein.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

Referring to FIG. 7, for example, a method 700 of wireless communications in operating UE 110 according to the above-described aspects includes one or more of the herein-defined actions.

For example, at 702, method 700 includes transmitting a mid-amble position indication or UE capability information. In an aspect, communications component 150, e.g., in conjunction with processor 512, memory 516, modem 140, etc., can transmit (e.g., to a base station 105) at least one of the mid-amble position indication 152 or the UE capability information 154. As described, for example, the mid-amble position indication 152 can include an explicit indicator of a desired position within a slot (e.g., a symbol index within the slot) at which the UE 110 desires to receive the mid-amble DMRS. In another example, the UE capability information 154 may identify one or more parameters regarding a capability of the UE 110 to receive and process DMRSs within a slot, such as one or more parameters of receiver performance/complexity, parameters related to a sensed wireless environment, etc. In addition, communications component 150 can transmit the mid-amble position indication 152 or the UE capability information 154 using static, semi-static, or dynamic signaling (e.g., in UCI, using RRC signaling, etc.). In one example, communications component 150, can transmit both the mid-amble position indication and UE capability information (e.g., and/or may do so using different types of signaling—such as static, semi-static, dynamic, etc., in UCI, RRC signaling, and/or the like). In this example, the base station 105 may consider one or both of the mid-amble position indication 152 or the UE capability information 154 in determining a mid-amble position for the UE 110.

Further, at 706, method 700 includes receiving a transmission including a transmitted slot having a preamble and a mid-amble, where the mid-amble is at a position within the slot based on the mid-amble position indication or the UE capability information. In an aspect, communications component 150, e.g., in conjunction with processor 512, memory 516, modem 140, etc., can receive the transmission including the transmitted slot having the preamble and the mid-amble, where the mid-amble is at a position (e.g., in a certain symbol) within the slot based on the mid-amble position indication 152 or UE capability information 154 previously transmitted by the UE 110. In an aspect, the preamble and the mid-amble can include one or more pilot signals or other reference signals, such as DRMSs that can be used for channel estimation within the corresponding slot. For example, communications component 150 can receive one of slot 300 (including preamble DMRS at symbol 306 and mid-amble DMRS at symbol 307) or slot 400 (including preamble DMRS at symbol 406 and mid-amble DMRS at symbol 407), based on the mid-amble position indication 152 or UE capability information 154. Other preamble and mid-amble DMRS symbol configurations are possible, and can be configured based on the mid-amble position indication 152 or UE capability information 154.

In an aspect, the mid-amble position indication 152 or the UE capability information 154 may identify the mid-amble position as an end position that is adjacent to an end of the slot (e.g., or at least to an end of the DL portion of the slot). As such, in some cases, receiving the transmitted slot includes receiving the mid-amble at the end position, whereas in other cases receiving the transmitted slot includes receiving the mid-amble at a position within the slot prior to the end position, such as at symbols 307 or 407 in FIGS. 3 and 4). In an example, the communications component 150 may assume a certain symbol of the slot for receiving the mid-amble based on indicated UE capability information 154, or may receive an indication of the symbol within the slot, as described in further detail below, based on the UE capability information 154 and/or other considerations by the base station 105.

In one example, at 704, method 700 includes receiving a network-selected mid-amble position indication identifying the position within the slot at which the mid-amble is transmitted. In an aspect, communications component 150, e.g., in conjunction with processor 512, memory 516, modem 140, etc., can receive the network-selected mid-amble position indication (e.g., from base station 105) identifying the position (e.g., a symbol index) within the slot at which the mid-amble is transmitted. For example, communications component 150 can receive the network-selected mid-amble position indication in DCI, RRC signaling, etc. from the base station. As described, for example, the network-selected mid-amble position indication may be different from a mid-amble position indication 152 indicated by the UE 110 or derived at least in part from the UE capability information 154. Thus, in one example, the UE 110 may indicate a last symbol in the slot (e.g., a last DL symbol), and/or a corresponding UE capability, for receiving the mid-amble, but the network-selected mid-amble position indication may indicate an earlier occurring symbol at which the mid-amble is transmitted. In either case, the UE 110 may expect to receive the mid-amble at the indicated position within the slot, and may, at 706, receive the transmission including the transmitted slot having the preamble and the mid-amble, where the mid-amble is at a position within the slot based on the network-selected mid-amble position (e.g., as received at 704).

Optionally, at 708, method 700 further includes performing non-causal channel estimation using both the preamble and the mid-amble when the mid-amble is at about a middle of the slot. In an aspect, communications component 150, e.g., in conjunction with processor 512, memory 516, modem 140, etc., can perform the non-causal channel estimation using both the preamble and the mid-amble when the mid-amble is at about a middle of the slot. For example, referring to slot 300, 400 in FIGS. 3 and 4, communications component 150 can perform the channel estimation for data received in one or more of symbols 309, 409 (or symbols 308, 408) based on the preamble at symbol 306, 406 and mid-amble at symbol 307, 407, where the mid-amble at symbol 307, 407 is at a position in about a middle of the slot 300, 400.

In an alternative, optionally, at 710, method 700 further includes performing non-causal channel estimation using both the preamble and the mid-amble when the mid-amble is adjacent to an end of the slot. In an aspect, communications component 150, e.g., in conjunction with processor 512, memory 516, modem 140, etc., can perform the non-causal channel estimation using both the preamble and the mid-amble when the mid-amble is adjacent to an end of the slot (e.g., adjacent to a first non-DL symbol, such as a guard period, in the slot).

Referring to FIG. 8, for example, a method 800 of wireless communications in operating base station 105 according to the above-described aspects includes one or more of the herein-defined actions.

For example, at 802, method 800 includes receiving a mid-amble position indication or UE capability information. In an aspect, communications component 170, e.g., in conjunction with processor 612, memory 616, modem 160, etc., can receive (e.g., from a UE 110) at least one of the mid-amble position indication (e.g., mid-amble position indication 152) or the UE capability information (e.g., UE capability information 154). As described, for example, the mid-amble position indication 152 can include an explicit indicator of a desired position within a slot (e.g., a symbol index within the slot) at which the UE 110 desires to receive the mid-amble DMRS. In another example, the UE capability information 154 may identify one or more parameters regarding a capability of the UE 110 to receive and process DMRSs within a slot, such as one or more parameters of receiver performance/complexity, parameters related to a sensed wireless environment, etc. In addition, communications component 170 can receive the mid-amble position indication 152 or the UE capability information 154 from the UE 110 via static, semi-static, or dynamic signaling (e.g., in UCI, using RRC signaling, etc.). In one example, the UE 110 can transmit, and communications component 170 may receive, both the mid-amble position indication and UE capability information (e.g., which may or may not correspond to different types of signaling—such as static, semi-static, dynamic, etc., in UCI, RRC signaling, and/or the like).

Further, at 804, method 800 includes determining, based at least in part on the mid-amble position indication or UE capability information, a mid-amble position within the slot for transmitting the mid-amble. In an aspect, communications component 170, e.g., in conjunction with processor

612, memory 616, modem 160, etc., can determine, based at least in part on the mid-amble position indication 152 or UE capability information 154, a mid-amble position within the slot for transmitting the mid-amble. For example, communications component 170 can determine the mid-amble position based on the UE capability information. For example, the UE capability information can indicate one or more parameters related to receiving/processing capabilities of the UE, e.g., with respect to receiving DMRSs, performing channel estimation, etc., and the communications component 170 can accordingly determine whether the UE 110 can support receiving a mid-amble at all and/or in a later symbol of a slot. Communications component 170 can accordingly determine the symbol of the slot for transmitting the mid-amble. In addition, in an example, communications component 170 can determine the mid-amble symbol to be that indicated in a received mid-amble position indication 152.

In one example, communications component 170 can determine the symbol for the mid-amble based on one or more additional or alternative considerations, such as symbols selected for transmitting mid-ambles to other UEs, sensed or received wireless environment conditions, etc. In this regard, for example, communications component 170 may select a symbol for the mid-amble that is different from that indicated in the received mid-amble position indication 152 or assumed to be determined based on the UE capability information 154. In one example, communications component 170 may select a symbol occurring earlier than that indicated in the received mid-amble position indication 152 or assumed to be determined based on the UE capability information 154.

Furthermore, in an example where both the mid-amble position indication 152 and the UE capability information 154 are received, communications component 170 may consider one or both of the mid-amble position indication 152 or the UE capability information 154 in determining a mid-amble position for the UE 110. For example, the mid-amble position indication 152 may be used to determine a preferred mid-amble position, and the UE capability 154 may be used to determine an absolute mid-amble position (e.g., a maximum mid-amble position), and/or vice versa. For example, communications component 170 may use both to determine a mid-amble position that complies with the UE capability 154 and is as close to the mid-amble position indication 152 as possible given other considerations, such as wireless environment, number of UE's served and their respective mid-amble positions, etc.

In an example, optionally at 806, method 800 includes transmitting a network-selected mid-amble position indication identifying the determined mid-amble position. In an aspect, communications component 170, e.g., in conjunction with processor 612, memory 616, modem 160, etc., can transmit (e.g., to the UE 110) the network-selected mid-amble position indication 178 identifying the determined mid-amble position. For example, communications component 170 can transmit the network-selected mid-amble position indication 178 where it differs from that indicated in the received mid-amble position indication 152 or assumed to be determined based on the UE capability information 154. In another example, communications component 170 can transmit the network-selected mid-amble position indication 178 in any case. For example, communications component 170 can transmit the network-selected mid-amble position indication 178 in DCI, using RRC signaling, etc.

Further, at 808, method 800 includes transmitting a transmission including a transmitted slot having a preamble and a mid-amble, where the mid-amble is at the determined mid-amble position. In an aspect, communications component 170, e.g., in conjunction with processor 612, memory 616, modem 160, etc., can transmit the transmission including the transmitted slot having the preamble and the mid-amble, where the mid-amble is at the determined mid-amble position. In an aspect, the preamble and the mid-amble can include one or more pilot signals or other reference signals, such as DRMSs that can be used for channel estimation within the corresponding slot. For example, communications component 170 can transmit one of slot 300 (including preamble DMRS at symbol 306 and mid-amble DMRS at symbol 307) or slot 400 (including preamble DMRS at symbol 406 and mid-amble DMRS at symbol 407), based on the mid-amble position indication 152 or UE capability information 154. Other preamble and mid-amble DMRS symbol configurations are possible, and can be configured based on the mid-amble position indication 152 or UE capability information 154, as described.

In an aspect, the mid-amble position indication 152 or the UE capability information 154 may identify the mid-amble position as an end position that is adjacent to an end of the slot (e.g., or at least to an end of the DL portion of the slot). As such, in some cases, transmitting the transmitted slot includes transmitting the mid-amble at the end position, whereas in other cases transmitting the transmitted slot includes transmitting the mid-amble at a position within the slot prior to the end position, such as at symbols 307 or 407 in FIGS. 3 and 4).

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method, comprising: transmitting, by a user equipment (UE), a UE capability information that indicates support for receiving a mid-amble demodulation reference signal (DMRS) within a slot that also includes a preamble DMRS; receiving, by the UE, a transmission including a transmitted slot having the preamble DMRS and the mid-amble DMRS, wherein the preamble DMRS is at a preamble symbol position within the transmitted slot, and wherein the mid-amble DMRS is at a different symbol position within the transmitted slot; and performing, based on at least one of the preamble DMRS or the mid-amble DMRS, channel estimation and data demodulation of data from the transmission, and wherein performing the channel estimation and the data demodulation are based on using both the preamble DMRS and the mid-amble DMRS.

2. The method of claim 1, wherein the UE capability information facilitates identification of the different symbol position based on a certain symbol of the slot.

3. The method of claim 2, wherein receiving the transmitted slot includes receiving the transmitted slot having the mid-amble DMRS at the certain symbol.

4. The method of claim 2, wherein receiving the transmitted slot includes receiving the transmitted slot having the mid-amble DMRS at the different symbol position within the transmitted slot prior to the certain symbol.

5. The method of claim 4, further comprising receiving a network-selected mid-amble position indication for identifying the different symbol position within the slot, prior to the certain symbol, at which the mid-amble DMRS is transmitted.

6. The method of claim 1, wherein transmitting the UE capability information comprises transmitting the UE capability information using at least one of static signaling or semi-static signaling.

7. The method of claim 1, further comprising determining the different symbol position based at least in part on transmitting the UE capability information and a last downlink symbol of a physical downlink shared channel (PDSCH) within the slot.

8. An apparatus, comprising: a transceiver for communicating one or more wireless signals via one or more antennas; a memory configured to store instructions; and one or more processors communicatively coupled with the transceiver and the memory, wherein the one or more processors are configured to: transmit a UE capability information that indicates support for receiving a mid-amble demodulation reference signal (DMRS) within a slot that also includes a preamble DMRS; receive a transmission including a transmitted slot having the preamble DMRS and the mid-amble DMRS, wherein the preamble DMRS is at a preamble symbol position within the transmitted slot, and wherein the mid-amble DMRS is at a different symbol position within the transmitted slot; and perform, based on at least one of the preamble DMRS or the mid-amble DMRS, channel estimation and data demodulation of data from the transmission based on at least one of the preamble DMRS or the mid-amble DMRS, and wherein the one or more processors are configured to perform the channel estimation and the data demodulation using both the preamble DMRS and the mid-amble DMRS.

9. The apparatus of claim 8, wherein the UE capability information facilitates identification of the different symbol position based on a certain symbol of the slot.

10. The apparatus of claim 9, wherein the one or more processors are configured to receive the transmitted slot includes having the mid-amble DMRS at the certain symbol.

11. The apparatus of claim 9, wherein the one or more processors are configured to receive the transmitted slot having the mid-amble DMRS at the different symbol position within the transmitted slot prior to the certain symbol.

12. The apparatus of claim 11, wherein the one or more processors are further configured to receive a network-selected mid-amble position indication for identifying the different symbol position within the slot, prior to the certain symbol, at which the mid-amble DMRS is transmitted.

13. The apparatus of claim 8, wherein the one or more processors are configured to transmit the UE capability information using at least one of static signaling or semi-static signaling.

14. The apparatus of claim 8, wherein the one or more processors are further configured to determine the different symbol position based at least in part on transmitting the UE capability information and a last downlink symbol of a physical downlink shared channel (PDSCH) within the slot.

* * * * *